United States Patent [19]

May

[11] Patent Number: 5,036,738
[45] Date of Patent: Aug. 6, 1991

[54] PORTABLE SAW MILL

[76] Inventor: Jim May, 10751 SE. 258th Pl., Gresham, Oreg. 97080

[21] Appl. No.: 383,610

[22] Filed: Jul. 24, 1989

[51] Int. Cl.$^5$ ............................................. B27B 3/26
[52] U.S. Cl. ..................................... 83/102; 83/471.2; 83/477.1; 83/485
[58] Field of Search ............... 83/102.1, 491.2, 475, 83/471, 477.1, 485, 486, 487, 488, 748, 471.1

[56] References Cited

U.S. PATENT DOCUMENTS

| | | | |
|---|---|---|---|
| 2,479,998 | 8/1949 | Bunkovsky | 83/102.1 |
| 3,398,771 | 8/1968 | May | 83/471.2 |
| 4,531,438 | 7/1985 | Pair | 83/102.1 |
| 4,753,144 | 6/1988 | May | 83/102.1 |

Primary Examiner—Hien H. Phan
Attorney, Agent, or Firm—Eugene M. Eckelman

[57] ABSTRACT

A horizontal disc supported on a sawmill carriage arranged to project into a kerf made by a horizontal saw on the carriage whereby to provide vertical braced stabilization between a log and the carriage. The carriage also supports an abutment foot which faces the log and is arranged to have slidable engagement with a vertical surface of the log to control the depth of cut. The horizontal disc and abutment foot have adjustable movement whereby to have simultaneous extending and retracting movements. Hold down wheels are also provided which when set are arranged to forceably press the wheels down on a log to provide vertical stabilization.

2 Claims, 2 Drawing Sheets

PORTABLE SAW MILL

BACKGROUND OF THE INVENTION

This invention relates to new and useful improvements in portable saw mills.

Portable saw mills have heretofore been provided for the purpose of transporting the mill directly to the site of a log or to a central area wherein logs do not have to be transported major distances. This general type of saw is illustrated in my U.S. Pat. No. 3,398,771 and also in my U.S. Pat. No. 4,753,144, and has been found to be very economically feasible for the smaller type operations.

In the use of a portable saw mill of this type, it has frequent use for sawing small logs and this creates some rather serious problems in making the saw cuts since these smaller logs are difficult to hold steady at certain times when the saw cuts are being made. That is, the pulling power of the saw teeth frequently causes a small log to wobble or chatter and this can produce uneven or unacceptable saw cuts. In addition, most small logs are not precisely straight and thus it is difficult to hold the log or slabs being cut therefrom steady. Further yet, the portable mill utilizes long supporting frames for the carriage and due to the length of the frame it oftentimes bends slightly and this of course also can produce uneven cuts.

SUMMARY OF THE INVENTION

According to the present invention and forming a primary objective thereof, a portable saw mill is provided which incorporates improved stabilizing means arranged to stabilize the log or parts cut therefrom and also arranged to use a log to reinforce the longitudinal frame on which a carriage travels.

A more particular object is to provide first stabilizing means on the carriage having a horizontal disc which rides in a saw kerf for the purpose of providing vertical stabilization between a log and the carriage.

Another object is to provide second stabilizing means employing an abutment foot on the carriage having a face surface which slidably engages a vertical surface of a log to control the depth of cut and also for providing lateral stabilization between the log and the carriage, this second stabilizing means being operatively connected to said first stabilizing means for simultaneous operation therewith.

Another object is to provide third stabilizing means comprising hold-down wheels on the carriage arranged to forcibly press down on a log to provide vertical stabilization between a log and the carriage.

In accomplishing these objects, the first stabilizing means comprises a horizontal disc and a laterally adjustable arm arranged to support the disc on the carriage in a plane such that the disc has a portion arranged to follow a horizontal saw and project into a kerf made by the horizontal saw. Operator adjustment and indicating means are provided for this stabilizing means at the operator's control end of the carriage. The second stabilizing means comprises an abutment foot having a face surface and an arm integral with the abutment foot arranged to support it on the carriage with the face surface in slidable engagement against a vertical surface of a log, this arm being laterally adjustable for locating the abutment foot in selected lateral adjustments for varying the depth of cut of the saw blades and also to provide a stabilizing function. Operator adjustment and indicating means are provided for this latter stabilizing means at the operator's control end of the carriage, and importantly, the abutment foot is operatively connected to the laterally adjustable disc for unitary movement wherein when the abutment foot is adjusted laterally into abutment with a vertical surface of a log to control the depth of cut of a horizontal saw, the disc will automatically move into alignment with a kerf to be made by the saw. The third stabilizing means comprises horizontal axis hold-down wheels on the carriage, and link means arranged to support the wheels on the outer side of the saw cut. A pressure operating mechanism is combined with the link means to forcibly press the wheels down on a log being cut to provide a vertical stabilizing function. This latter stabilizing means utilizes disabling mechanism operative at the end of a cut to automatically disable such stabilizing means. This latter mechanism utilizes operator actuating means to initiate use thereof.

The invention will be better understood and additional objects and advantages will become apparent from the following description taken in connection with the accompanying drawings.

DETAILED DESCRIPTION OF A PREFERRED EMBODIMENT

Figure 1:
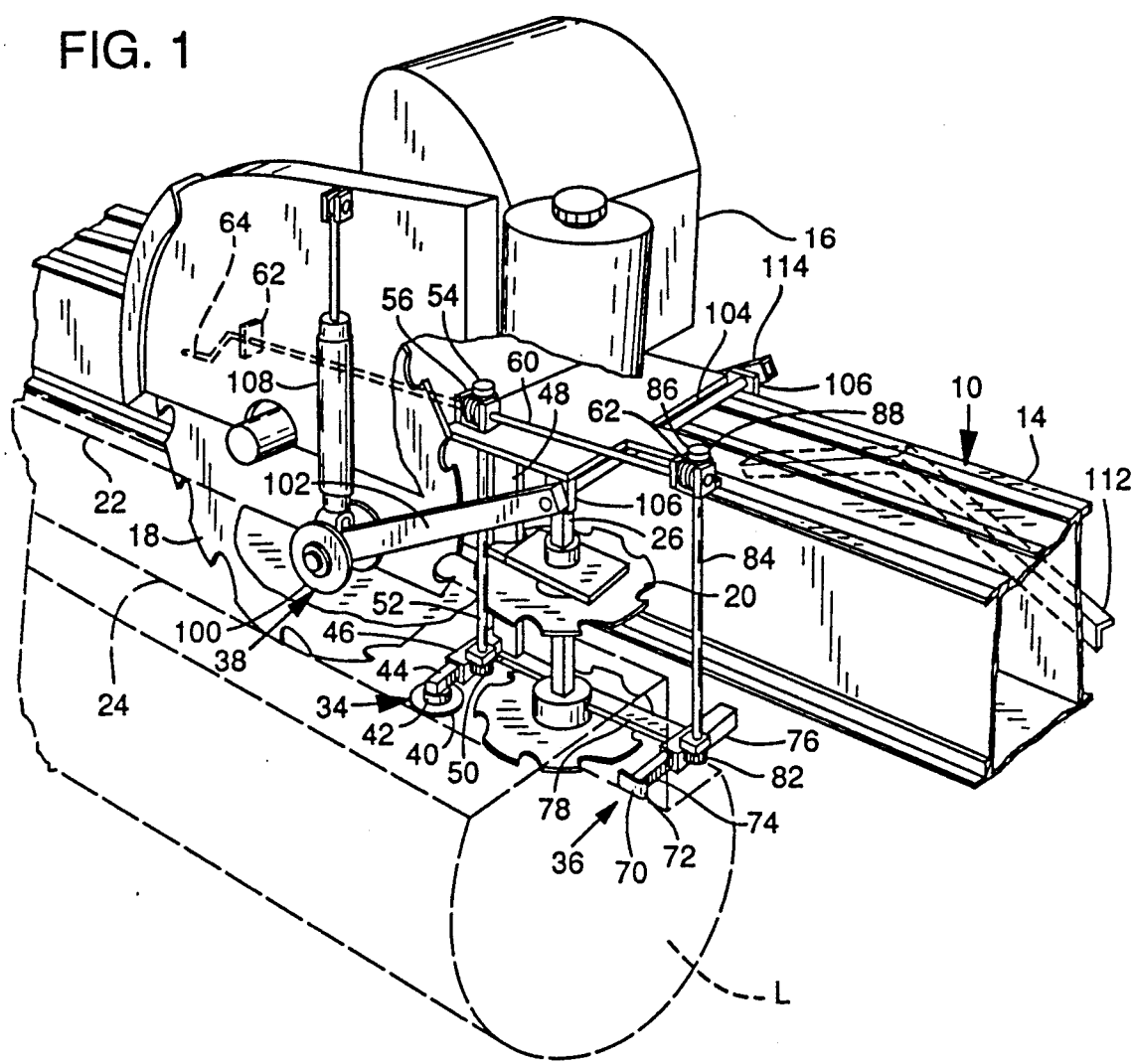
FIG. 1 is a perspective view of the present saw mill illustrating the stabilizing means of the invention, this view being taken obliquely from the front of the carriage.
Figure 2:
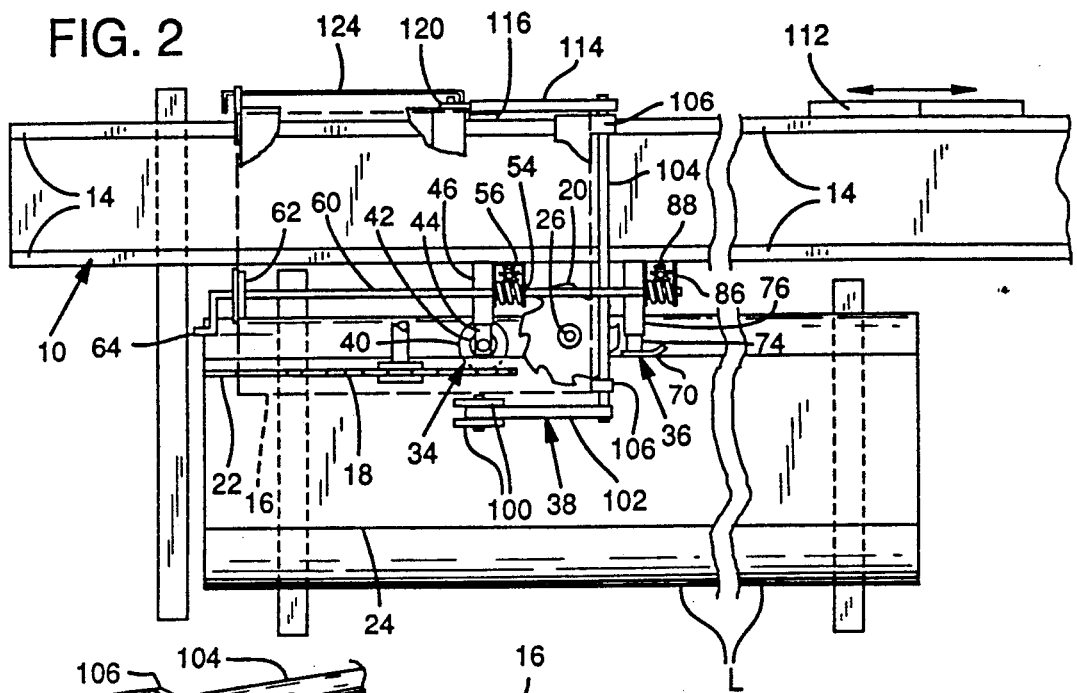
FIG. 2 is a top plan view, a portion of which is diagrammatic, showing the saw mill anchored to a log.
Figure 3:
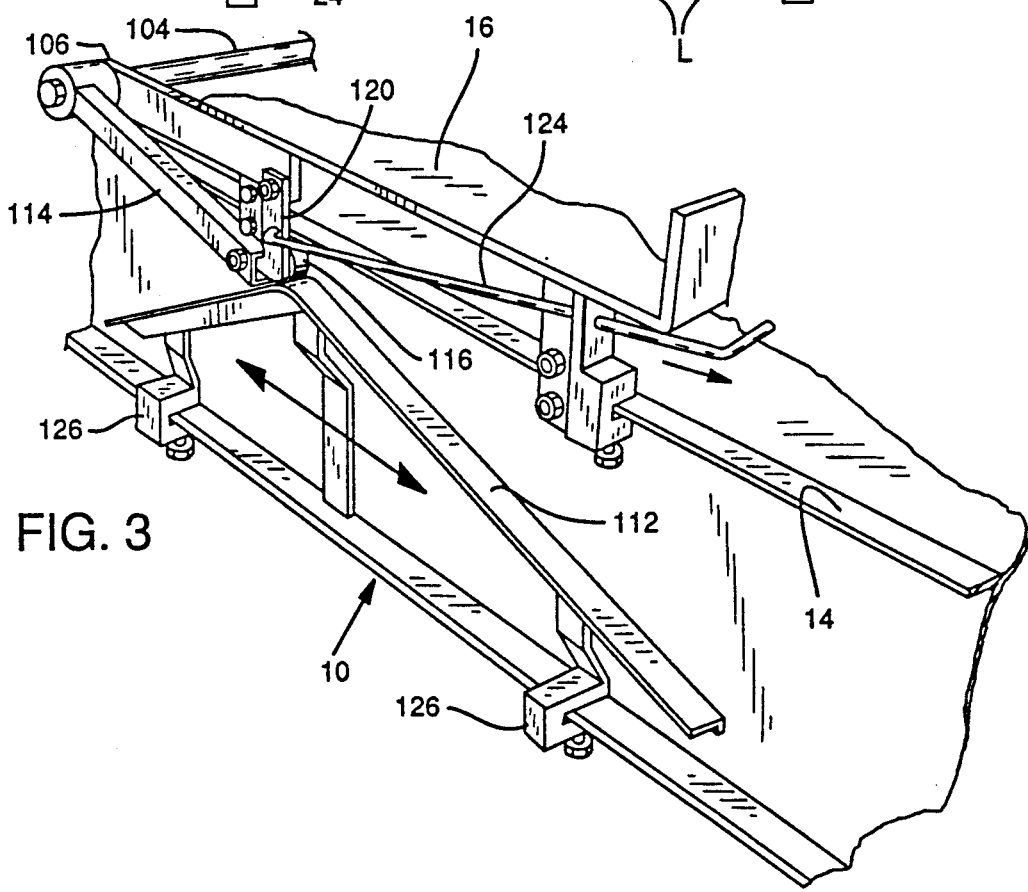
FIG. 3 is a fragmentary perspective view taken from the opposite side of the carriage from that shown in FIG. 1 and illustrating the disabling mechanism for the third stabilizing means.

With reference first to FIGS. 1 and 2, the present invention is shown in connection with a portable saw mill which is anchored securely to a log L, or vice versa, and accessive cuts are made longitudinally of the log. The numeral 10 designates a conventional elongated saw carriage frame preferably comprising a longitudinal tubular member with roller track members 14 along its upper side edges. Frame 10 supports a movable carriage 16, and this carriage carries a power driven vertical saw blade 18 and one or more power driven horizontal saw blades 20. Blades 18 and 20 cooperate upon longitudinal movement of the carriage frame 16 to provide vertical and horizontal cuts 22 and 24 respectively on the log. The carriage has a depending shaft 26 as in conventional structures, for driving support of the horizontal saws.

Frame 10 can be temporarily positioned relative to the log L by laterally disposed rail members in a conventional manner, FIG. 2. The frame is laterally adjustable relative to the log in a well known manner for producing the desired board thickness, and also well known adjustment means are provided on the carriage to provide desired board widths and thicknesses. The pulling forces of the saw blades acting on the log exert distorting forces, particularly when the log is relatively small or when initial and final cuts are being made. The present stabilizing means stabilize the log and carriage and in brief comprise three elements. A first stabilizer, designated by the numeral 34, comprises a disc which trails the saws (cuts) and is arranged to follow in a horizontal kerf. A second stabilizer, designated by the numeral 36, comprises an abutment foot arranged for abutment against a vertical edge of the log. A third stabilizer, designated by the numeral 38, comprises hold-down means on the carriage capable of riding on the log for stabilizing the log or carriage.

The first stabilizer 34 comprises a horizontal disc 40 having a thickness less than the saw cut or kerf 24. Disc 40 includes upstanding hub 42 having journaled support on the end of a horizontal rack arm 44 slidably supported in a laterally extending tubular housing 46 integrally secured to a vertical bracket 48 in turn integrally secured to the carriage. Rack arm 44 is engaged by a pinion gear 50 integrated with an upright shaft 52 journaled at its lower end on the housing 46 and at its upper end in a bearing 54 on the carriage. The upper end of shaft 52 has a worm and pinion gear connection 56 with a longitudinal shaft 60 supported in suitable end bearings 62 on the carriage and extending from the operator's station to a point vertically above the second stabilizing means 36. Shaft 60 terminates in a crank handle 64 at the operator's control end of the carriage.

It is apparent that upon operation of the crank handle 64 the horizontal arm 44 and thus the disc 40 will be moved toward or away from the kerf 24 made by the lower horizontal saw 20. As will be more apparent hereinafter, the function of the disc 40 is to provide vertical stabilization of the horizontal saws and the log. The radius of the disc beyond the hub 42 is less than a usual depth of kerf whereby the hub 42, which is freely rotatable on the arm 44, will abut against a vertical portion of the log and roll freely thereon. Also, as will be more apparent hereinafter, abutment of the log by the hub 42 will provide some lateral stabilization between the carriage and the log, the housing 46 and bracket 48 being of sturdy construction to provide lateral and vertical stabilization.

The second stabilizer 36 comprises a foot member 70 arranged to abut against the log. This foot member has an angled leading portion 72 arranged to slide along a surface of the log without biting into the log. Foot member 70 is integral with a laterally extending rack arm 74 slidably supported in a housing 76 integrated solidly with the housing 46 by a sturdy strut 78. Strut 78 supports the housing 76 and the foot member 70 in a sturdy lateral position so that it is capable of providing lateral stabilization of the carriage relative to a log. Rack arm 74 is engaged by a pinion gear 82 integrated with an upright shaft 84 journaled at its lower end on the housing 76 and at its upper end in a bracket 86 integral with the carriage and terminating at its upper end in a worm and pinion gear connection 88 with horizontal shaft 60. By operation of the crank handle 64, the foot member 70 can be selectively adjusted laterally to engage the log or it can be retracted from the log, its extent of travel in the housing 76 being sufficient to engage a log in the various thicknesses of lumber cuts. Suitable gauge means, not shown, at the operator's end of the carriage are associated with the shaft 60 to designate the thickness of cut.

Since the disc 40 and foot member 70 are both moved by a common shaft 60, the disc will move automatically into position in alignment with the horizontal kerf made by the lower saw 20 when the thickness of board to be cut is established by selected extension of the foot member. Thus, the first stabilizing means will always be in position without the necessity of being set by the operator. Selected positioning of the disc 40 in assembly of the machine comprises aligning the outer surface portion of the hub 42 with the outer surface 70 of the stabilizing means 36 whereby the hub 42 will roll along a vertical surface of the log and the disc will project into the kerf.

The third stabilizer 38 comprises one or more wheels 100 having free rolling support on one end of a lever 102 integrated at its other end with a cross bar 104 journaled on the carriage 16 by suitable bearings 106. The end of the lever with the wheels thereon is urged forcibly downwardly by a pressured drive member 108 connected at its upper end to the carriage. This drive member may comprise a loaded shock absorber type structure such as a gas shock and is arranged when not disabled to apply a downward pressured force on a log. The drive member 108 is normally internally urged to an expanded condition as shown in FIG. 1 but can be forced to retracted position. Retracting movement of this member against the pressured force thereof is accomplished by clockwise pivoting movement of the lever 102, FIG. 1, driven in such pivoting movement by clockwise rotation of shaft 104.

It is desired that the wheels 100 be raised and locked in their upper retracted position for each return movement of the carriage. For raising the wheels, the sawmill frame 10 is provided with a ramp 112 located on the side of the frame opposite from the stabilizer 38, and the cross bar 104 is provided with a lever 114 with a roller 116 thereon engageable with the ramp and capable of rotating the bar and retracting the member 108 as the roller 116 moves up the ramp. For locking the member 108 in its retracted condition, a latch 120 is provided on the carriage which is arranged to engage the end of lever 114 when it nears the top of the ramp 112. The latch 120 will remain in latched position and hold the parts in the loaded condition of the drive member 108 until released by the operator. Release thereof is accomplished by a longitudinal pull rod 124 which extends to the operator's control end of the carriage. The wheels 100 will be raised at every pass of the carriage to the end of the log, assuming that the ramp 112 is positioned so as to cause its function. The operator must release the drive member 108 on passes of the saws he feels that the stabilizer 38 is necessary. The ramp 112 is adjustable on the frame 10 to accommodate log length, and for this purpose it is removably and adjustably secured to the frame by suitable adjustable clamp means 126 or the like.

Figure 4A:
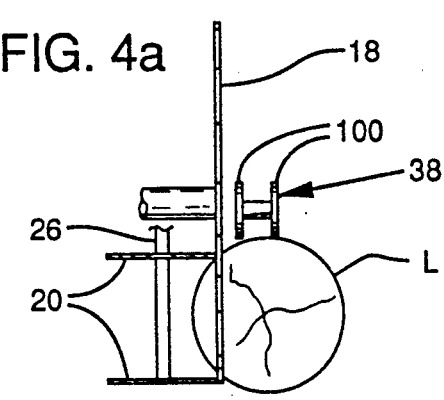
FIGS. 4a and 4b show some log cuts for the purpose of illustrating functions of the present stabilizers.

In operation, the stabilizing means are used when it is necessary to stabilize the saw blades relative to the log. As an example, and with reference to FIG. 4a, the hold-down wheels 100 may desirably be released to engage the log during a first slab cut. More particularly, in the event that the log is quite small or is long whereby the carriage frame 10 has a long suspension in end supports, the wheels 100 apply a good vertical stabilizing connection between the log and the carriage. The use of the wheels at this time is important since in some cuts, especially first cuts, the horizontal saws may not have yet penetrated the log and thus it is not possible for the disc 42 to provide vertical stabilization by riding in a kerf. After initial boards or slabs have been cut, then the horizontal saw will produce a kerf and the disc 42 will move into the horizontal kerf. The disc 42 will always move into the kerf when the bottom saw makes a kerf.

In addition to controlling the thickness of the board being cut, foot member 70 will also steady a log or the carriage laterally.

Figure 4B:
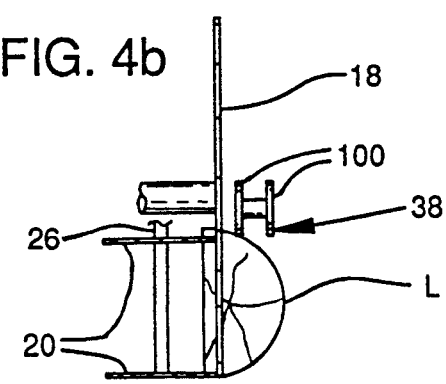

FIG. 4b shows the condition of a small log which has been almost half cut into boards. When the log gets down to a small segment, namely, an upright segment and a bottom segment, the wheels 100 are very beneficial in supporting this remaining portion of the log. Since the log is quite small it can wobble laterally and vertically but stabilization can be accomplished by the use of the stabilizers. With the use of these stabilizers, a bottom segment L1 of the log, as shown in FIG. 4b, can be converted to boards simply by rolling the log such that its uncut segment assumes a vertical position. It is then dogged in place and board cuts therefrom while using a desired combination of the stabilizers.

According to the invention, more efficient board cuts can be made and also more boards can be obtained from a log. Also, both vertical and lateral stabilization can be achieved so that small logs can be efficiently converted to boards. This is accomplished by using the stabilizing means either singly or in combination and at any time where they can come into play to produce better saw cuts.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A saw mill comprising:
an elongated supporting frame,
a carriage driven longitudinally on the frame,
means supporting the frame in parallel relation to a log,
power driven vertical and horizontal saws on the carriage for producing vertical and horizontal board cuts in the log,
a horizontal disc on said carriage having a portion arranged to project into a kerf made by the horizontal saw whereby to provide vertical braced stabilization between the log and the carriage,
abutment means on said carriage having a face surface facing the log and being arranged to slidably engage a vertical surface of the log to control the depth of cut of said horizontal saw on the carriage,
said abutment means being adjustable to selected lateral positions for varying the depth of cut of the saw blade,
drive means connected to both of said horizontal disc and said abutment means in an arrangement wherein said disc is moved into alignment with a kerf to be made by said horizontal saw at the same time that the face surface of said abutment means is moved into engagement with the vertical surface of the log,
and an operator control end on said carriage,
said drive means comprising adjustment means operative by the operator at the operator control end and having a connecting link with both of said abutment means and said horizontal disc to move them at the said same time.

2. A saw mill comprising:
an elongated supporting frame,
a carriage driven longitudinally on the frame,
means supporting the frame in parallel relation to a log,
power driven vertical and horizontal saws on the carriage for producing vertical and horizontal board cuts in the log,
a horizontal disc on said carriage having a portion arranged to project into a kerf made by the horizontal saw whereby to provide vertical braced stabilization between the log and the carriage,
abutment means on said carriage having a face surface facing the log and being arranged to slidably engage a vertical surface of the log to control the depth of cut of said horizontal saw on the carriage,
said abutment means being adjustable to selected lateral positions for varying the depth of cut of the saw blade,
drive means connected to both of said horizontal disc and said abutment means in an arrangement wherein said disc is moved into alignment with a kerf to be made by said horizontal saw at the same time that the face surface of said abutment means is moved into engagement with the vertical surface of the log,
and an operator control end on said carriage,
said drive means comprising an elongated shaft having journaled support on said carriage with operator rotation means at said operator control end,
gear means on said shaft,
and a pair of arm means on said carriage supporting said disc and said abutment means respectively,
said arm means being driven laterally upon rotation of said shaft and said gear means to move them at the same time.

* * * * *